United States Patent [19]

Jonescu

[11] 3,919,389
[45] Nov. 11, 1975

[54] METHOD OF PURIFYING AIR CONTAINING MERCURY VAPOR

[75] Inventor: Vasile Jonescu, Bucharest, Romania

[73] Assignee: i Proiectari Automatizari si Proiectari Uzine si Instalatil Pentru Industria Electrotehnica Institutul de Cercetari, Bucharest, Romania

[22] Filed: Dec. 26, 1973

[21] Appl. No.: 428,192

Related U.S. Application Data

[63] Continuation-in-part of Ser. No. 141,925, May 10, 1971, Pat. No. 3,817,713.

[52] U.S. Cl. ............................................. 423/210
[51] Int. Cl. ........................................... B01d 53/34
[58] Field of Search ....................... 423/210; 55/72

[56] References Cited
UNITED STATES PATENTS

| | | | |
|---|---|---|---|
| 3,194,629 | 7/1935 | Drelbelbis et al. | 423/210 X |
| 3,661,509 | 5/1972 | Ferrara et al. | 423/210 |
| 3,725,530 | 4/1973 | Kawase et al. | 423/210 |
| 3,817,713 | 6/1974 | Ionescu | 423/210 X |

Primary Examiner—Earl C. Thomas
Attorney, Agent, or Firm—Karl F. Ross; Herbert Dubno

[57] ABSTRACT

A method for the removal of mercury vapor from air containing same which comprises introducing the air into the top of a first chamber which is larger at its top than at its bottom and subjecting the air therein to a spray of aqueous sodium sulfide solution. The liquid is thereafter collected along the small floor of this chamber in a tank from which the sodium sulfide solution is recirculated to the spray. The air is induced to flow in an undulating path around vertical baffles and through droplet or mist filters which trap (hold back) any residual droplets before being released to the atmosphere.

5 Claims, 1 Drawing Figure

U.S. Patent Nov. 11, 1975 3,919,389
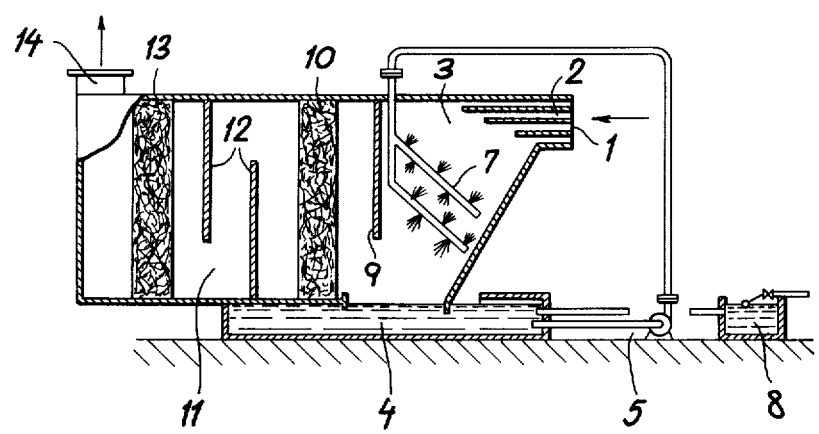

METHOD OF PURIFYING AIR CONTAINING MERCURY VAPOR

CROSS-REFERENCE TO RELATED APPLICATIONS

This Application is a continuation-in-part of application Ser. No. 141,925 filed 10 May 1971, now U.S. Pat. No. 3,817,713.

FIELD OF THE INVENTION

The present invention relates to a method of removing mercury vapor from air containing same and to a process for the purification of air containing mercury vapor, the contaminated air being derived from industrial plants for the manufacture of light bulbs, mercury vapor lamps, fluorescent tubes and control and measuring instruments.

BACKGROUND OF THE INVENTION

Earlier processes for the recovery of mercury vapor from air by condensation used ring filters and cooling towers and had the disadvantage of excessively large sizes.

It was also proposed to remove mercury vapor from air by passing the contaminated air over a catalyst bed of active carbon or aluminum. These systems produced mercury sulfide or sulfur and have the disadvantage that they are expensive and require repeated regeneration of the catalyst.

OBJECT OF THE INVENTION

It is the principal object of the present invention to provide an improved method of removing mercury vapor from air to purifying air contaminated with mercury vapor whereby the aforementioned disadvantages are obviated.

SUMMARY OF THE INVENTION

The above-mentioned disadvantages are eliminated and a rapid purification of mercury-containing air can be obtained in a small space by treating the air with an aqueous solution of 10% by weight sodium sulfide which is dispersed (atomized) into a space through which the air stream is guided. More particularly the purification process is carried out in an apparatus having a chamber whose upper cross-section (in horizontal plane) is provided with a system of spraying nozzles for the sodium sulfide solution and with a chamber for retaining the droplets. The latter chamber is provided with baffles and is separated from the first chamber by a droplet-collecting mist filter. The term "droplet-collecting" or "mist" filter is intended to describe a filter of the type in which impingement of a droplet-entraining air stream results in accumulation of the liquid phase which percolates downwardly to a collecting tank or floor beneath the filter.

DESCRIPTION OF THE DRAWING

The above and other objects, features and advantages of the present invention will become more readily apparent from the following description, reference being made to the accompanying drawing in which the sole FIGURE represents a vertical cross-section through an apparatus embodying the invention.

SPECIFIC DESCRIPTION AND EXAMPLE

In the apparatus for the removal of mercury vapor from air from an industrial plant of the type described, air contaminated with mercury vapor, is passed in the direction of arrow A by a supply conduit 1 provided with vertically spaced horizontal parallel guide blades 2 into a chamber 3 whose bottom cross-section (in a horizontal plane) is smaller than its top cross-section (likewise in a horizontal plane).

At the bottom of chamber 3 there is a tank 4 containing an aqueous solution of 10% by weight sodium sulfide and from which the solution transported by a recirculating pump 5 through a conduit and supplied into the contaminated air stream by a nozzle system 7 at a rate of 0.75 liters/m$^2$/second.

To replace water lost from the solution, a water tank 8 is connected to and provided next to tank 4.

After spraying, the air stream is deflected around a baffle 9 extending from the upper portion of chamber 3 downwardly to the floor of this chamber, passes through a mist filter 10 extending across the entire cross-section of the floor path, and enters into a second chamber 11 provided with horizontally spaced vertical baffles 12 extending alternately upwardly and downwardly in overlapping relation and holding back the droplets entrained with the air and which drop onto the floor of the chamber near the tank 4.

From chamber 11 the purified gas traversing the mist filter 13 is vented by a discharge pipe 14.

The installation insures an effective purification of air contaminated with mercury vapor and is of compact construction such that, in the case of small air flows which can be mounted directly in the ventilating ductwork. The system needs only a small quantity of sodium sulfide per annum, has small consumption of electrical power and can operate without interruption, except for the replacement of the sodium sulfide solution which may take place one a month to once a year as required.

I claim:

1. A process for the removal of mercury vapor from air contaminated therewith, comprising the steps of:
    a. passing the contaminated air into a first chamber and treating the contaminated air therein with a finely divided aqueous solution of about 10% sodium sulfide;
    b. collecting droplets of the sodium sulfide solution in said chamber;
    c. passing the air treated with said sodium sulfide solution into a second chamber and conduiting the air along a tortuous path therein; and
    d. intercepting droplets entrained with the air in said further chamber with a mist filter.

2. The process defined in claim 1 wherein the contaminated air is admitted into an upper portion of said first chamber in step (a) and is guided horizontally into said upper portion, said solution being sprayed downwardly into said first chamber from the upper portion thereof.

3. The process defined in claim 2 wherein said solution is sprayed into said upper portion of said first chamber at a flow rate of substantially 0.75 liter/m$^2$/second.

4. The process defined in claim 3 further comprising the step of recirculating the droplets collected in step (b) to said upper portion of said first chamber.

5. The process defined in claim 4 further comprising venting the air upon its passage through said mist filter in step (b).

* * * * *